(12) United States Patent
Mizuno et al.

(10) Patent No.: US 6,843,132 B2
(45) Date of Patent: Jan. 18, 2005

(54) PRESSURE SENSOR

(75) Inventors: Kentaro Mizuno, Nisshin (JP); Kouji Tsukada, Seto (JP); Yoshiteru Omura, Seto (JP); Shoji Hashimoto, Seto (JP); Jiro Sakata, Nagoya (JP)

(73) Assignee: Kabushiki Kaisha Toyota Chuo Kenkyusho, Nagakute-cho (JP)

( * ) Notice: Subject to any disclaimer, the term of this patent is extended or adjusted under 35 U.S.C. 154(b) by 0 days.

(21) Appl. No.: 10/845,196

(22) Filed: May 14, 2004

(65) Prior Publication Data

US 2004/0231425 A1 Nov. 25, 2004

(30) Foreign Application Priority Data

May 21, 2003 (JP) ........................................ 2003-142874

(51) Int. Cl.[7] ................................................ G01L 7/08
(52) U.S. Cl. ................................ 73/715; 73/700; 92/91
(58) Field of Search ........................ 73/700–731; 92/34, 92/90, 91

(56) References Cited

U.S. PATENT DOCUMENTS

| | | | |
|---|---|---|---|
| 4,711,129 A | 12/1987 | Stubenberg et al. | |
| 6,120,033 A | 9/2000 | Filippi et al. | |
| 6,376,120 B1 * | 4/2002 | Azema | 429/61 |
| 6,595,064 B2 * | 7/2003 | Drewes et al. | 73/718 |

FOREIGN PATENT DOCUMENTS

| | | |
|---|---|---|
| JP | A 7-19981 | 1/1995 |
| JP | A 7-306107 | 11/1995 |

* cited by examiner

Primary Examiner—Edward Lefkowitz
Assistant Examiner—Alandra Ellington
(74) Attorney, Agent, or Firm—Oliff & Berridge, PLC

(57) ABSTRACT

A pressure sensor is realized wherein output error of sensor element can be reduced even in the case where the pressure sensor is utilized in high temperature conditions. A pressure sensor is provided with a housing 20, a diaphragm 24 that partitions the interior and the exterior of the housing 20, a sensor element 54 provided within the housing 20, output value of the sensor element 54 varying in accordance with force exerted thereupon, and a force transmitting rod 52 provided within the housing, the force transmitting rod 52 moving downwardly when a pressure is exerted upon the diaphragm 24, the force transmitting rod 52 thereby exerting force upon the sensor element 54. The diaphragm 24 has a central region 26 contacting with the force transmitting rod 52, and a surrounding region 27 surrounding the periphery of the central region 26 and connecting the central region 26 with the housing 20. The surrounding region 27, viewed cross-sectionally along the radius, is V-shaped or U-shaped, and cancels thermal expansion.

9 Claims, 11 Drawing Sheets

PRESSURE SENSOR

CROSS-REFERENCE

The present application claims priority based on Japanese Patent Application 2003-142874 filed on May 21, 2003. The specification and figures of that Japanese application are hereby incorporated by reference as a part of the specification and figures of the present application.

FIELD OF THE INVENTION

The present invention relates to pressure sensors.

BACKGROUND OF THE INVENTION

A pressure sensor is utilized to measure a pressure of various circumstances, such as a pressure of a combustion gas (combustion pressure) in an internal combustion engine.

(FIRST PRIOR ART) A prior art pressure sensor shown in FIG. 13 is provided with a housing 20, a diaphragm 102, a force transmitting member 52 and a sensor element 54. The diaphragm 102 partitions an interior and an exterior of the housing 20. The force transmitting member 52 is provided within the housing 20 and moves downwardly in the figure, when a pressure at the exterior of the housing 20 is exerted upon a top surface 102a of the diaphragm 102. The sensor element 54 is provided within the housing 20 and changes output value in accordance with a force exerted thereupon. A force due to the pressure at the exterior of the housing 20 is exerted upon the sensor element 54 via the diaphragm 102 and the force transmitting member 52.

When the pressure sensor is located within a combustion chamber of an internal combustion engine and a pressure of a combustion gas operates upon the diaphragm 102, a force due to the combustion pressure is exerted upon the sensor element 54. Consequently, it should be possible to measure the combustion pressure from the output value of the sensor element 54.

The pressure operating upon the diaphragm 102 is not constant, but instead varies in accordance with a crank angle of the internal combustion engine. The pressure operating upon the diaphragm 102 is largest during an explosion process of the internal combustion engine, and smallest during an admission process. During the explosion process, high pressure of the combustion gas operates upon the diaphragm 102 and simultaneously high temperature of the combustion gas also operates thereupon.

When a high temperature fluid makes contact with the diaphragm 102, thermal expansion of the outer surface 102a (the side making contact with the high temperature fluid) of the diaphragm 102 occurs, and a shape of the diaphragm 102 is changed due to temperature increase as shown in FIG. 14, that is, a center region of the diaphragm 102 is moved upwardly. As a result, a contacting face between the diaphragm 102 and the force transmitting member 52 moves (drift) upwardly from a predetermined reference position. Consequently, a posterior end face (a face contacting with the sensor element 54) of the force transmitting member 52 shown in FIG. 13 moves upwardly.

As a result, in the case where the combustion gas pressure is exerted upon the diaphragm 102, the combustion gas heat causes upward movements of the diaphragm 102 and the force transmitting member 52, and the sensor element 54 outputs a value smaller than an output value corresponding to the actual pressure. An output error of the sensor element 54 is thus created. For example, as shown in FIG. 15, with the horizontal axis showing the crank angle of the internal combustion engine and the vertical axis showing the output values of the sensor element 54, a graph C obtained from measurement by the pressure sensor shown in FIG. 13 has lower values than a graph B corresponding to actual pressure variations. The pressure thus detected is excessively low.

(SECOND PRIOR ART) In a pressure sensor as shown in FIG. 16, a central region 112 of a diaphragm 110 is shifted downwardly with respect to a surrounding region of the diaphragm 10. In this pressure sensor, even if a thermal expansion of a top surface 110a (the side making contact with the hot combustion gas) of the diaphragm 110 occurs, a contacting face between the diaphragm 110 and the force transmitting member 52 is prevented from moving upwardly, and the output error of the sensor element 54 is lower than in the case of the first prior art.

The detail of the second prior art is disclosed in Japanese Laid Open Patent Publication (TOKKAI-HEI) 7-19981 (specifically in FIG. 1).

However, there is a problem that the output error of the sensor element 54 still cannot be sufficiently reduced by the pressure sensor of the second prior art shown in FIG. 16. In this pressure sensor, the diaphragm 110 and the force transmitting member 52 can be prevented from moving upwardly when the high temperature combustion gas makes contact with the diaphragm 110. However, when the high temperature combustion gas makes contact with the diaphragm 110, a thermal expansion of downwardly-inclined portions 114 occurs. As a result, a contacting face between the diaphragm 110 and the force transmitting member 52 moves (drifts) downwardly with respect to the housing 20. Consequently, a posterior end face (a face contacting with the sensor element 54) of the force transmitting member 52 also moves downwardly.

As a result, in the case where the hot combustion gas pressure is exerted upon the diaphragm 110, the combustion gas heat causes downwards movements of the diaphragm 110 and the force transmitting member 52, and the sensor element 54 outputs a value greater than an output value corresponding to the actual pressure. An output error of the sensor element 54 is thus created. For example, as shown in FIG. 15, with the horizontal axis showing the crank angle of the internal combustion engine and the vertical axis showing the output values of the sensor element 54, a graph A obtained from measurement by the pressure sensor shown in FIG. 16 has greater values than the graph B corresponding to the actual pressure variations. The pressure thus detected is excessively high.

SUMMARY OF THE INVENTION

The object of the present invention is to realize a pressure sensor wherein output error of a sensor element can be reduced even in a case where the pressure sensor is utilized in high temperature conditions.

In one aspect of a pressure sensor of the present invention, a diaphragm that partitions an interior and an exterior of a housing has a first region contacting with a force transmitting member, and a second region connecting the first region with the housing. The second region has folded portions, the folded portions being formed from at least two portions connected together. When viewed from the first region towards the housing, one folded portion is inclined in the direction of movement of the force transmitting member when the pressure is exerted upon the diaphragm, and the other folded portion is inclined in the opposite direction.

Since the force transmitting member moves towards the inside of the housing when the pressure is exerted upon the diaphragm, it is also possible to say that the second region of the diaphragm has two portions, one portion extending towards the inside of the housing (when viewed from the first region towards the housing), and the other portion extending towards the outside of the housing.

It should be noted that the description 'the portion extending towards the inside of the housing, when viewed from the first region towards the housing' is identical in a meaning with 'the portion extending towards the outside of the housing, when viewed from the housing towards the first region'.

In the present specification, there is a distinction between 'direction' and 'direction of movement'. Two 'directions of movement' are included in one 'direction'. For example, 'upwards movement' and 'downwards movement' are included in the up-down direction.

A joint of the folded portions extending towards the inside of the housing and extending towards the outside of the housing is located in a middle area of the second region. In the diaphragm of the present invention, the joint is located further inwards or outwards with respect to the housing than a first region-side edge of the second region, or than a housing-side edge of the second region. If the middle area of the second region of the diaphragm is located further inwards or outwards than the first region-side edge of the second region, or than the housing-side edge of the second region, the diaphragm is provided with the folded portions within the second region. The folded portions are formed from at least the two portions connected together, one portion is inclined in the direction of movement of the force transmitting member when the pressure is exerted upon the diaphragm, and the other portion is inclined in the direction opposite the force transmitting member moving direction.

According to this aspect, in the case where the thermal expansion of the diaphragm occurs as a result of the high temperature fluid making contact with the diaphragm, the folded portions provided in the second region cancels at least some degree of the thermal expansion. As a result, it is possible to reduce the degree of misalignment of the first region of the diaphragm with respect to the housing when the diaphragm is affected by heat. Consequently, it is also possible to reduce the degree of misalignment of the force transmitting member with respect to the sensor element. As a result, the output error of the sensor element can be reduced.

According to this aspect, a pressure sensor can be realized wherein the output error of the sensor element can be reduced even in the case where the pressure sensor is utilized in high temperature conditions.

The diaphragm may have an approximately round shape. In that case, it is preferred that the first region is located at a center of the approximately round diaphragm, and that the second region is located at a periphery of the first region. In that case, the sensor configuration is symmetrical around a line of a moving path of the force transmitting member, and the force transmitting member can move smoothly.

In the case where the diaphragm has an approximately round shape, it is preferred that the first region and the second region are provided concentrically.

In the case where the diaphragm has an approximately round shape, it is preferred that the second region, when viewed in a cross-section along a radius of the diaphragm, is V-shaped or U-shaped. The term 'V-shaped' includes an inverted V-shape. The term 'U-shaped' includes an inverted U-shape. It is preferred that the V-shape or U-shape is symmetrical at left and right sides with respect to the moving path of the force transmitting member.

At least some degree of the thermal expansion of the diaphragm is effectively canceled.

An inner circumference portion of the second region may be inclined (when viewed from the first region towards the housing) in the direction in which the force transmitting member moves when the pressure is exerted upon the diaphragm, and an outer circumference portion of the second region may be inclined in the direction opposite the moving direction of the force transmitting member.

Conversely, the inner circumference portion of the second region may be inclined (when viewed from the first region towards the housing) in the direction opposite the moving direction of the force transmitting member, and the outer circumference portion may be inclined in the moving direction of the force transmitting member.

The first region-side edge of the second region or the housing-side edge of the second region may be exposed to the exterior of the housing.

It is preferred that the first region is located at a central region of the diaphragm and that the second region surrounds a periphery of the central region. The second region may form a closed loop.

It is preferred that the force transmitting member and at least a portion of the housing supporting the diaphragm are formed of material having a thermal expansion coefficient smaller than that of the diaphragm.

In this aspect, the aforementioned portion of the housing and the diaphragm are formed of different materials. Consequently, it is possible to maintain freedom about the choice of material of which the diaphragm is formed. Nevertheless, since it is possible to have only a small difference in the thermal expansion coefficients of the force transmitting member and the aforementioned portion of the housing, it is possible to suppress the shape change of the diaphragm that may be caused by temperature changes. As a result, it is possible to reduce the output error of the sensor element that accompanies the shape change of the diaphragm due to temperature changes. Consequently, pressure can be detected accurately under conditions encompassing a broad range of temperatures.

In particular, it is preferred that the diaphragm is made of stainless steel. Stainless steel has the advantages of being resistant to corrosion, etc. Consequently, if the diaphragm is made of stainless steel, the diaphragm can be utilized satisfactorily over a long period of time even if the pressure fluid making contact with the diaphragm is corrosive.

It is preferred that the force transmitting member and at least a portion of the housing supporting the diaphragm are formed of materials having an approximately identical thermal expansion coefficient. Here, the term 'approximately identical thermal expansion coefficient' includes the case where (letting one thermal expansion coefficient be A, and letting the other thermal expansion coefficient be B): $|A-B|/A$ is equal to or below 0.2 (preferably equal to or below 0.1, and more preferably, equal to or below 0.05).

According to this aspect, it is possible to suppress the shape change of the diaphragm due to temperature changes. As a result, it is possible to reduce the output error of the sensor element that accompanies the shape change of the diaphragm. Consequently, pressure can be detected accurately under conditions encompassing a broad range of temperatures.

It is preferred that the diaphragm and the force transmitting member are formed in a unified manner.

According to this aspect, it is possible to suppress a change in relative positions of the diaphragm and the force transmitting member even when the pressure sensor is used in unstable conditions wherein vibrations or shocks are strong, and even when the pressure sensor is used for a long period of time. As a result, it is possible to suppress the reduction of accuracy in the pressure detection that tends to occur as a result of use in unstable conditions and as a result of use over a long period of time.

PREFERRED EMBODIMENTS TO PRACTICE THE INVENTION

Figure 1:
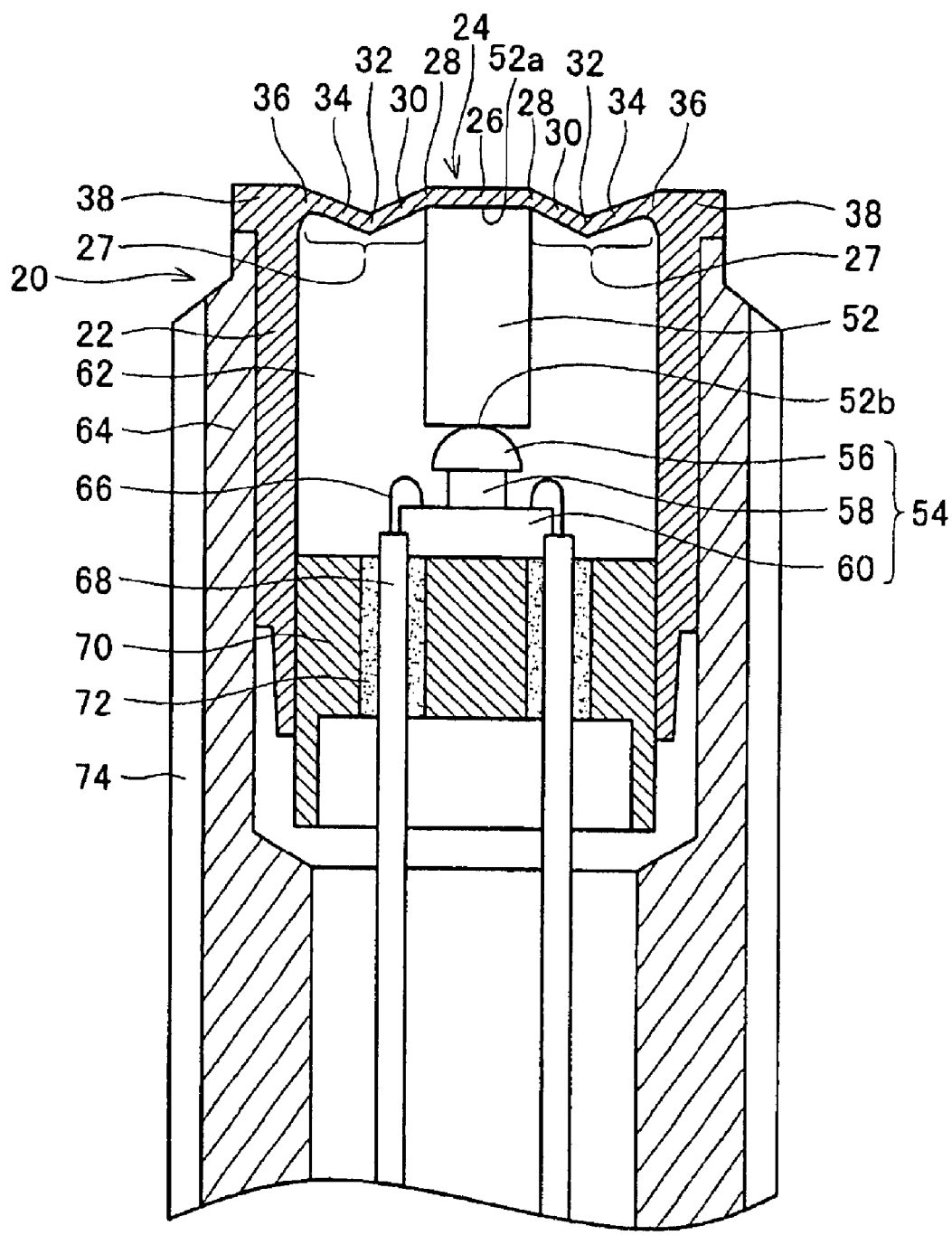
FIG. 1 shows a cross-sectional view of a pressure sensor of a first embodiment of the invention.
Figure 2:
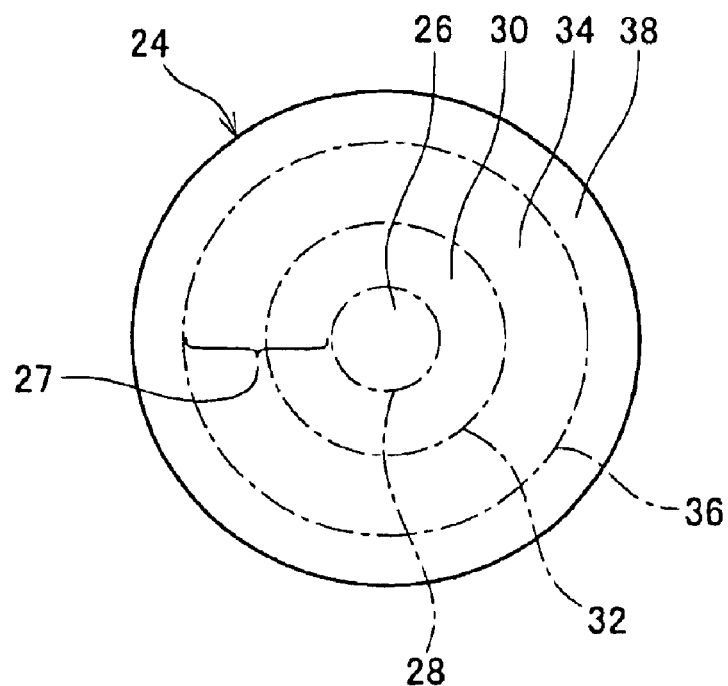
FIG. 2 shows a plan view of a diaphragm and a supporting portion of the diaphragm of the first embodiment.

FIG. 1 shows a cross-sectional view of a first embodiment of a pressure sensor of the present invention. The pressure sensor is provided with a housing 20, a diaphragm 24, a force transmitting rod (a force transmitting member) 52, a sensor element 54, etc. The upper side in FIG. 1 is defined as the anterior end and the lower side is defined as the posterior end. FIG. 2 shows a plan view of the diaphragm 24 of the pressure sensor, and a supporting portion 38 of the diaphragm 24. The pressure sensor is used, for example, by being attached to an engine block (not shown) of an internal combustion engine. The pressure sensor has a wide detecting range and can detect a high pressure of a combustion gas (combustion pressure) and a low pressure of an admission vacuum.

The housing 20 has an outer housing 64 and an inner housing 22. The housing 20 is formed in an approximately cylindrical shape. The axial direction of the housing 20 is the up-down direction of FIG. 1. A threading portion 74 is formed on an outer circumference surface of the outer housing 64. The threading portion 74 is threaded into a threading hole (not shown) formed in a cylinder head of the engine block.

The inner housing 22 is fitted into an anterior end of the outer housing 64. An outer circumference face of the inner housing 22 is welded to an inner circumference face of the anterior end of the outer housing 64. The diaphragm supporting portion 38 is provided at an anterior end of the inner housing 22. The diaphragm 24 is formed in a unified manner with the inner housing 22. The housings 22 and 64 and the diaphragm 24 are made of metal (for example, stainless steel). An outer circumference edge of the diaphragm 24 is connected in a unified manner with the diaphragm supporting portion 38 (the housing 20) and is fixed thereto. The diaphragm 24 partitions an interior and an exterior of the housing 20.

An anterior end face 52a of the column-shaped force transmitting rod 52 is attached to a posterior end face of the diaphragm 24. The force transmitting rod 52 is located within the housing 20. When a pressure is exerted upon the diaphragm 24, the force transmitting rod 52 moves downwardly, thereby exerting a force on the sensor element 54. Further, the force transmitting rod 52 is made of heat insulating material (for example, ceramic (zirconia, alumina, etc.)) so that the transmission of heat of the high temperature combustion gas to the sensor element 54 is suppressed.

A metal stem 70 is fitted into a posterior end of the inner housing 22. The stem 70 is first preloaded by being pushed upwardly, thus pushing the anterior end face 52a of the force transmitting rod 52 against the diaphragm 24, and then an outer circumference face of the stem 70 is welded to an inner circumference face of the posterior end of the inner housing 22. A posterior end face (a base face) of the sensor element 54 is bonded to an anterior end face of the stem 70. By this means, the location of the sensor element 54 with respect to the stem 70 is made certain, and the sensor element 54 is fixed thereto. An anterior end of the sensor element 54 (a top end of a hemisphere 56) is opposite (makes contact with) a posterior end face 52b of the force transmitting rod 52.

The sensor element 54 has a force detecting block 60 and force transmitting blocks 56 and 58. The force detecting block 60 has a rectangular parallelepiped shape and consists principally of a silicon substrate. A protruding portion (not shown) that has a long and narrow stepped mesa shape is formed on an anterior end face (a top face) of the force detecting block 60. A piezo-resistive element (a semiconductor distortion gauge) is formed in the protruding portion. When stress is exerted upon the piezo-resistive element, piezo-resistive effects cause the resistance value thereof to change. The piezo-resistive element may be a bridge configuration (a full bridge configuration, a half bridge configuration), or may be a single gauge configuration. Further, a group of electrodes made from metal (for example, aluminum, etc.) are formed in the force detecting block 60. The group of electrodes is connected with the piezo-resistive element.

The sensor element 54 may also be configured so as to contain piezo-electric element (piezo-electric ceramic element, etc.) instead of the piezo-resistive element.

The first force transmitting block 58 has a rectangular parallelepiped shape, and is made from glass. A posterior end face (a base face) of the first force transmitting block 58 is joined by means of an anode junction with the top face of the protruding portion of the force detecting block 60. The second force transmitting block 56 has a hemispherical shape, and is made of a metal such as iron, etc. A posterior end face (a base face) of the second force transmitting block 56 is bonded to an anterior end face (a top face) of the first force transmitting block 58. Furthermore, the second force transmitting block 56 may also be made of silicon, glass, etc.

A plurality of column-shaped through holes is formed in the stem 70, these through holes being formed in the up-down direction of FIG. 1. Long and narrow terminals (leader pins) 68 made of metal are inserted into these through holes. The long and narrow terminals 68 are fixed to the stem 70 by a sealing material (for example, molten glass) 72. By this means, an inner space 62 of the housing 20 becomes an enclosed space. In this manner, the stem 70, the long and narrow terminals 68, and the sealing material 72 are used to form hermetically sealed terminals.

One end of the long and narrow terminal 68 is connected with the electrode of the force detecting block 60 of the sensor element 54 via a metal wire 66. The other end of the long and narrow terminal 68 is connected, via a circuit containing an amplifier circuit etc., with a power source (a voltage source or a current source) or a measuring device (an ampere meter or a voltmeter).

Next, the configuration of the diaphragm 24 will be described. The diaphragm 24 has a central region (a first region) 26 and a surrounding region (a second region) 27. The membrane thickness of the diaphragm 24 is approximately uniform. When the diaphragm 24 is viewed from a plan view as shown in FIG. 2, the surrounding region 27 surrounds the circumference of the central region 26. An inner edge (a first edge) 28 of the surrounding region 27 connects with the central region 26. An outer edge (the second edge) 36 of the surrounding region 27 connects with the diaphragm supporting portion 38 (the housing 20). FIG. 1 shows a cross-section along a radius of the approximately round diaphragm 24. The inner edge 28 and the outer edge 36 of the surrounding region 27 are exposed to the exterior of the housing 20.

The surrounding region 27 has folded portions 30 and 34. The folded portion 30 extends from the central region 26 towards the housing 20 and inclined in a direction in which the force transmitting rod 52 moves when the pressure is exerted upon the diaphragm 24. That is, when viewed from the central region 26 towards the housing 20, the folded portion 30 is inclined towards the inside of the housing 20. The other folded portion 34 is a part of the surrounding region 27 that extends from the inner folded portion 30 towards the housing 20 and inclined in an opposite direction in which the force transmitting rod 52 moves when the pressure is exerted upon the diaphragm 24. That is, the folded portion 34, when viewed from the inner folded portion 34 towards the housing 20, is inclined towards the outside of the housing 20. The cross-sectional shape of the folded portions 30 and 34, along the radius thereof, is substantially a V-shape. Further, in the cross-section, as shown in FIG. 1, the left and right sides of the folded portions 30 and 34 are symmetrical.

A joint 32 between the inner folded portion 30 and the outer folded portion 34 is located further inwards, with respect to the housing 20, than a plane extending between the inner edge 28 and the outer edge 36 of the surrounding region 27.

In other terms, the folded portions 30 and 34 have an inner inclined portion (first inclined portion or third region) 30 and an outer inclined portion (second inclined portion or fourth region) 34. The inner inclined portion 30 extends from the inner edge 28 of the surrounding region 27 towards the joint 32, and is inclined downwardly. The outer inclined portion 34 extends from the joint 32 towards the outer edge 36 of the surrounding region 27, and is inclined upwardly. The inner inclined portion 30 and the outer inclined portion 34 have an approximately identical thickness and length. The inner inclined portion 30 and the outer inclined portion 34 have an approximately identical angle of inclination relative to a straight line extending downwards. However, no particular restrictions are placed on the thickness, length, and angle of inclination thereof.

The operation of the pressure sensor will now be described. When the pressure is exerted upon the diaphragm 24, the diaphragm 24 bends towards the posterior end (towards the inner space 62 of the housing 20) due to the pressure. As a result, the force transmitting rod 52 moves towards the posterior end. When the force transmitting rod 52 moves downwardly, compressive stress is exerted upon the piezo-resistive element of the sensor element 54. Consequently, the resistance values of the piezo-resistive element change. For example, in a case where a predetermined current is flowing from the current source to the piezo-resistive element, output voltage between the electrodes of the piezo-resistive element vary in accordance with pressure exerted upon the diaphragm 24. It is possible, by measuring the output voltage with a voltmeter, to detect the degree of resistance changes of the piezo-resistive element, and thereby to detect the degree of pressure exerted upon the diaphragm 24.

Figure 3:
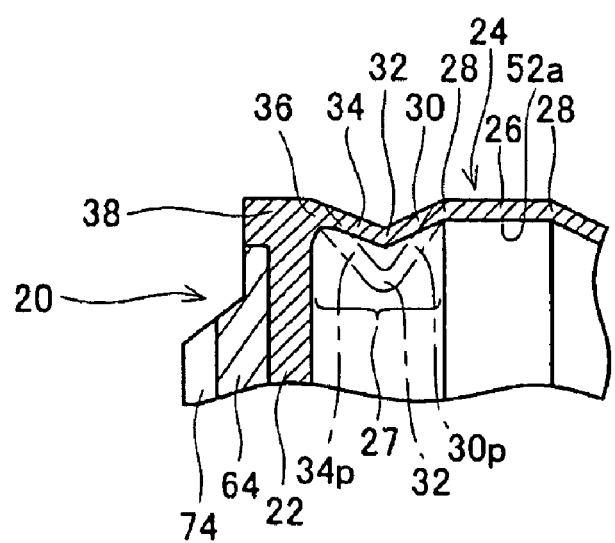
FIG. 3 shows an operation of the diaphragm of the first embodiment in a case where a high temperature combustion gas has made contact with the diaphragm.

Next, the operation (the movement) of the diaphragm 24, in the case where the high temperature combustion gas has made contact with the diaphragm 24, will be described with reference to FIG. 3. FIG. 3 schematically shows the movement of the diaphragm 24 in this case. When the high temperature combustion gas makes contact with the diaphragm 24, the inner inclined portion 30 and the outer inclined portion 34 expand. As a result, the outer inclined portion 34 changes the shape as shown by the dashed line 34p. Further, the inner inclined portion 30 changes the shape as shown by the dashed line 30p. In the drawing, the location of the dashed lines 34p and 30p has been somewhat exaggerated in order to render the figure clearer.

Specifically, the outer edge 36 of the outer inclined portion 34 is fixed to the diaphragm supporting portion 38 and consequently does not move its position. As the outer inclined portion 34 expands, joint 32 between the outer inclined portion 34 and the inner inclined portion 30 (the lower edge 32 of the outer inclined portion 34) moves downwardly. The lower edge 32 of the outer inclined portion 34 is also the lower edge of the inner inclined portion 30, thus the lower edge 32 of the inner inclined portion 30 moves downwardly. However, the inner inclined portion 30 expands, therefore the position of the upper edge 28 of the inner inclined portion 30 does not change substantially. Downwards movement of the lower edge 32 of the inner inclined portion 30 is substantially canceled by the expansion of the inner inclined portion 30. As a result, the degree of movement (degree of drift) of the inner edge 28 of the inner inclined portion 30, and consequently of the central region 26, is kept small even though the inner inclined portion 30 expands. The operation described above renders it possible to cancel, for the most part, the effect of expansion of the diaphragm 24 when the high temperature combustion gas has made contact therewith. Consequently, the degree of misalignment (degree of drift), relative to a reference position, of the force transmitting rod 52 attached to the central region 26 of the diaphragm 24 can be kept small. As a result, the output error of the sensor element 54 can be drastically reduced.

In a configuration wherein the force transmitting rod 52 moves extremely small distance due to thermal expansion of the diaphragm 24, it is preferred that the folded portions 30,34 are formed in an approximately symmetrical shape, as described above. As a result, the degree to which the inner inclined portion 30 expands and the degree to which the outer inclined portion 34 expands practically cancels one another.

By contrast, in a configuration wherein the force transmitting rod 52 moves relatively large distance due to thermal expansion of the diaphragm 24, the degree of movement of the diaphragm 24 due to thermal effect should be taken into consideration when determining the shape of the folded portions 30, 34. Specifically, when the force transmitting rod 52 moves relatively large distance upwardly due to thermal effect, the outer inclined portion 34 may be caused to expand further than the inner inclined portion 30 in the up-down direction. This may be achieved by changing, for example, the material, thickness, length or angle of inclination of the inner inclined portion 30 and the outer inclined portion 34. Consequently, as a result of the degree to which the outer inclined portion 34 expands in the up-down direction, it is possible to practically cancel the degree to which the inner inclined portion 30 expands in the up-down direction and the degree to which the force transmitting rod 52 moves in an upwards direction due to the thermal expansion of the diaphragm 24.

Since the output error of the sensor element 54 can thus be drastically reduced in this pressure sensor, it is possible to accurately detect not only the combustion pressure, but also the admission vacuum (this being much smaller than combustion pressure), etc.

Figure 4:
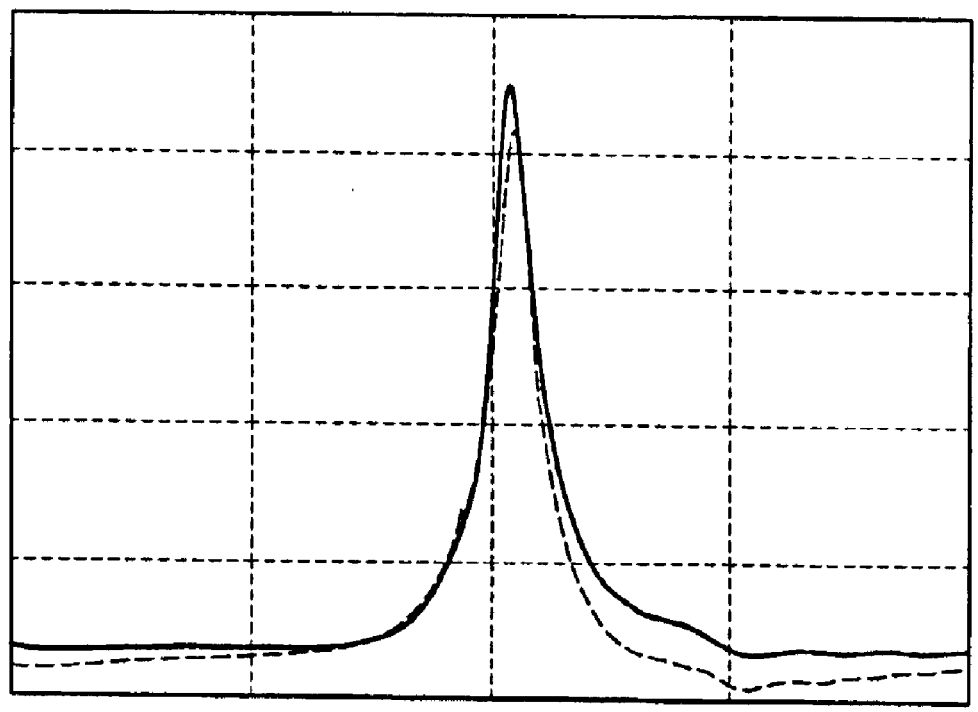
FIG. 4 shows graphs showing relationships between crank angles and sensor outputs.
Figure 13:
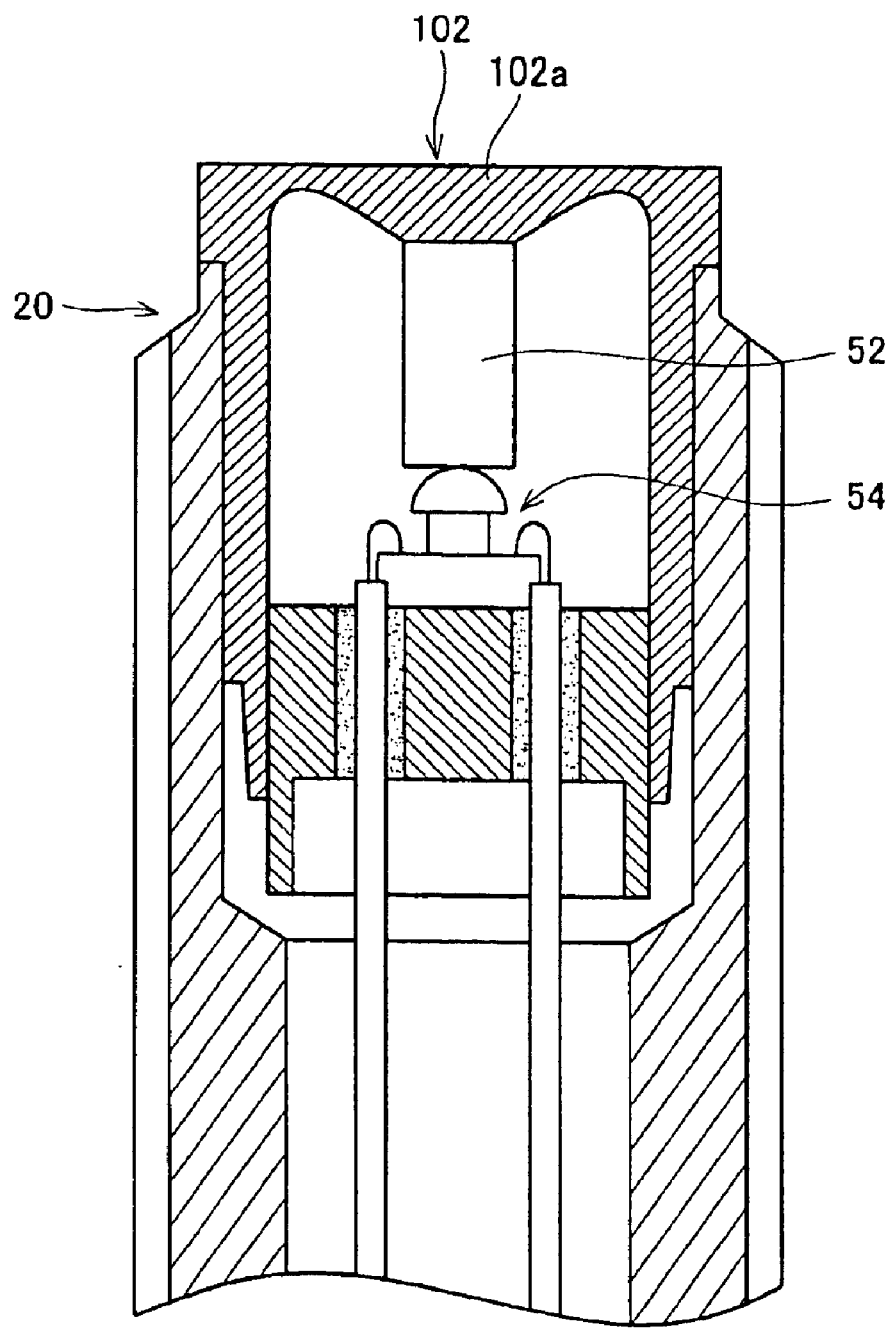
FIG. 13 shows a cross-sectional view showing a pressure sensor of a first prior art.
Figure 14:
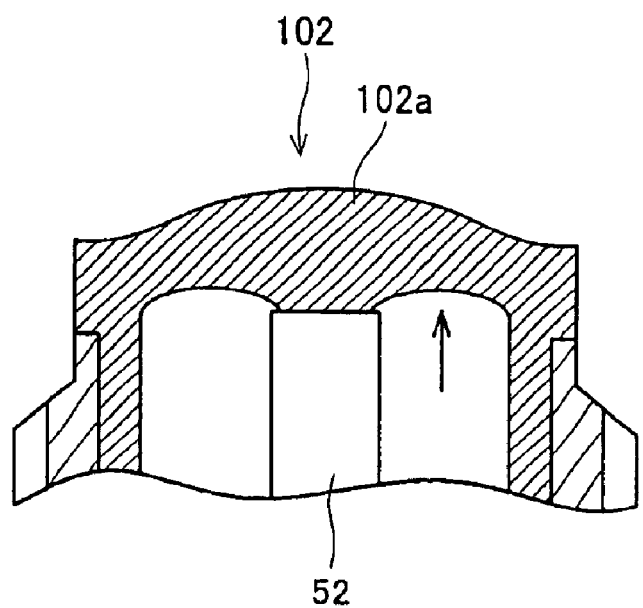
FIG. 14 shows the cross-sectional view of the diaphragm of the first prior art in a case where a high temperature combustion gas has made contact with the diaphragm.
Figure 15:
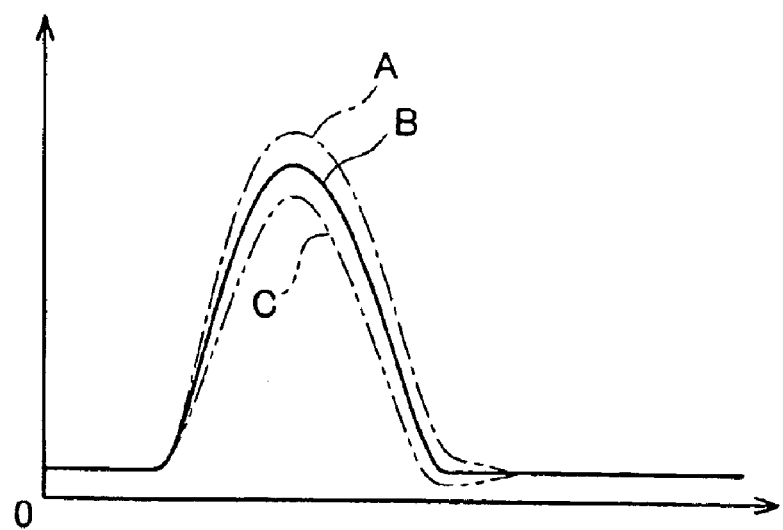
FIG. 15 shows graphs showing relationships between crank angles and sensor outputs.
Figure 16:
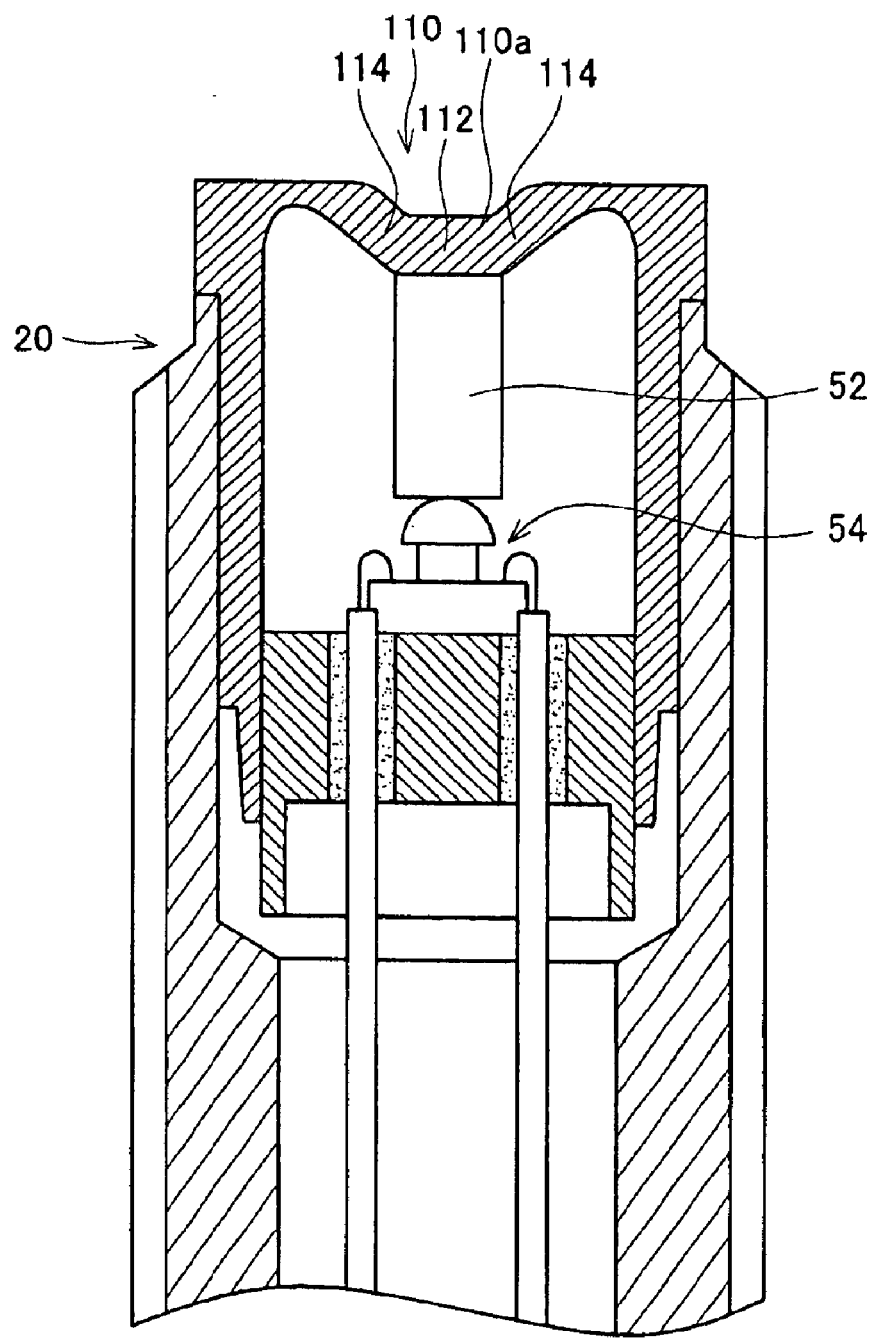
FIG. 16 shows a cross-sectional view showing a pressure sensor of a second prior art.

FIG. 4 shows graphs showing relationships between crank angles and sensor outputs. The horizontal axis shows the crank angle of the internal combustion engine and the vertical axis shows the output voltages of the sensor element 54. The solid line indicates the graph detected by the pressure sensor of the first embodiment and the dashed line indicates the graph detected by the pressure sensor of prior art as shown in FIG. 13. The solid line is more accurate that the dashed line.

Figure 5:
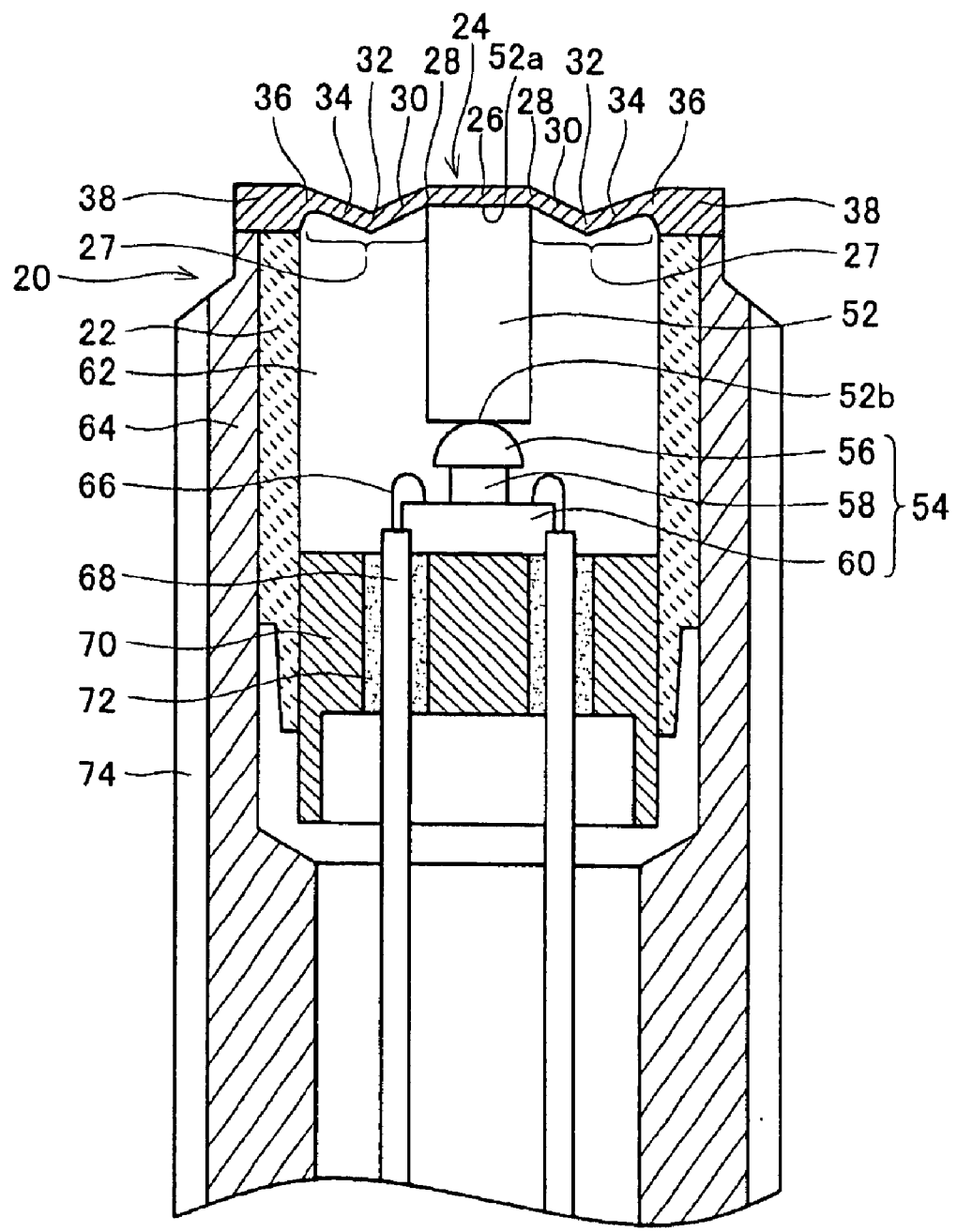
FIG. 5 shows a cross-sectional view showing a second embodiment of the invention.

(Second embodiment) FIG. 5 is a cross-sectional view showing a pressure sensor of a second embodiment of the invention. In the pressure sensor, an inner housing 22 is formed separately from a diaphragm 24 and a diaphragm supporting portion 38. The inner housing 22 is formed of metal having a thermal expansion coefficient smaller than that of the diaphragm 24. Specifically, the diaphragm 24 is made of stainless steel, as described above, whereas the inner housing 22 is made of covar. Further, the force transmitting rod 52 formed of ceramic, and the sensor element 54 made of silicon, etc. have a thermal expansion coefficient smaller than that of the stainless steel diaphragm 24.

Furthermore, it is preferred that the inner housing 22 and the force transmitting rod 52 are made of materials having an approximately identical thermal expansion coefficient. Moreover, it is preferred that the thermal expansion coefficient of the inner housing 22 and the thermal expansion coefficient of the force transmitting rod 52 and the sensor element 54, these latter two having been combined, are approximately identical.

In the case where the inner housing 22 and the diaphragm 24 are both made of stainless steel, the inner housing 22 has a greater thermal expansion coefficient than the force transmitting rod 52 and the sensor element 54. Consequently, when there is an increase in the temperature of the environment in which the pressure sensor is located, the central region 26 of the diaphragm 24 may move downwardly relative to the housing 20 (the diaphragm supporting portion 38). In this case, the diaphragm 24 changes shape away from a desired shape thereof. As a result, this configuration may be less effective in canceling expansion of the diaphragm 24, as described above, than in the case where the diaphragm 24 has the desired shape.

The main reason why the central region 26 of the diaphragm 24 moves downwardly is as follows. In the state before temperature changes occur, the force transmitting rod 52 exerts a pre-load in the downwards direction upon the sensor element 54. In other words, the force transmitting rod 52 receives an upwards reaction force. When the temperature increases, the degree to which the inner housing 22 expands in the up-down direction is greater than the sum value of the degree to which the force transmitting rod 52 and the sensor element 54 expand in the up-down direction. As a result, there is a reduction of the pre-load in the downwards direction exerted by the force transmitting rod 52 upon the sensor element 54. Consequently, the central region 26 of the diaphragm 24, this central region 26 being connected with the force transmitting rod 52, moves downwardly.

By contrast, in the configuration of the second embodiment, it is possible to reduce the difference between the sum value of the degree to which the force transmitting rod 52 and the sensor element 54 expand in the up-down direction and the degree to which the inner housing 22 expands in the up-down direction. As a result, it is possible to suppress the reduction of the upwards reaction force on the force transmitting rod 52. Consequently, it is possible to suppress the downwards movement of the central region 26 of the diaphragm 24, this central region 26 being connected with the force transmitting rod 52. As a result, it is possible to suppress the shape change of the diaphragm 24 away from the desired shape.

As a result, it is preferred that the diaphragm 24 and the housing connected therewith (in this example, the housing 22) are formed of materials having differing thermal expansion coefficients in order to suppress the change of shape or the change in characteristics of the diaphragm 24, these changes occurring as a result of the change in temperature.

Figure 6:
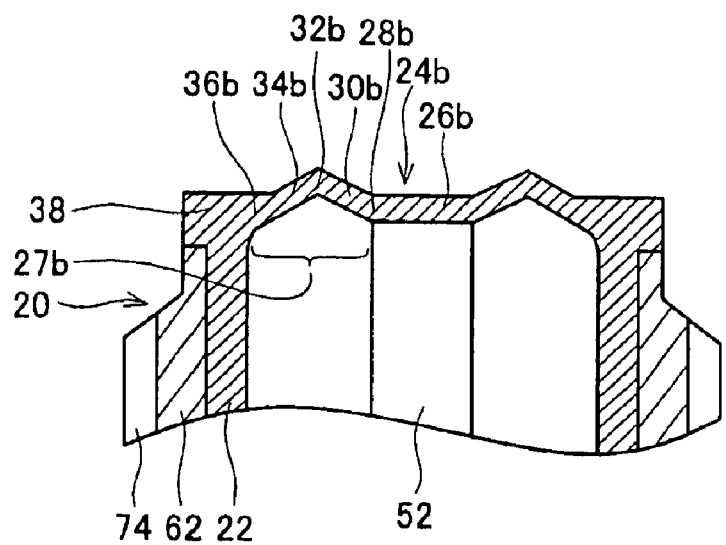
FIG. 6 shows a cross-sectional view showing a third embodiment of the invention.

(Third embodiment) In a third embodiment diaphragm 24b, as shown in a cross-section in FIG. 6, folded portions 30b and 34b formed in a surrounding region 27b are formed in an inverted V-shape. The folded portions 30b and 34b are configured such that they extend from an inner edge 28b of the surrounding region 27b towards the housing 20, and are folded at a location that is further upwards than the inner edge 28b. In the cross-section, as shown in FIG. 6, the folded portions 30b and 34b are approximately symmetrical.

In other terms, the folded portions have an inner inclined portion (third region) 30b and an outer inclined portion (fourth region) 34b. The inner inclined portion 30b extends from the inner edge 28b of the surrounding region 27b towards the joint 32b between the inner inclined portion 30b and the outer inclined portion 34b, and is inclined upwardly. The outer inclined portion 34b extends from the joint 32b towards the outer edge 36b thereof, and is inclined downwardly. The inner inclined portion 30b and the outer inclined portion 34b have an approximately identical thickness and length. The inner inclined portion 30b and the outer inclined portion 34 have an approximately identical angle of inclination relative to a straight line extending downwards.

The operation of the third embodiment diaphragm 24b is substantially same as that of the diaphragm 24 shown in FIG. 3. However, when the high temperature combustion gas makes contact with the diaphragm 24b, the joint 32b between the inner inclined portion 30b and the outer inclined portion 34b moves upwardly.

Figure 7:
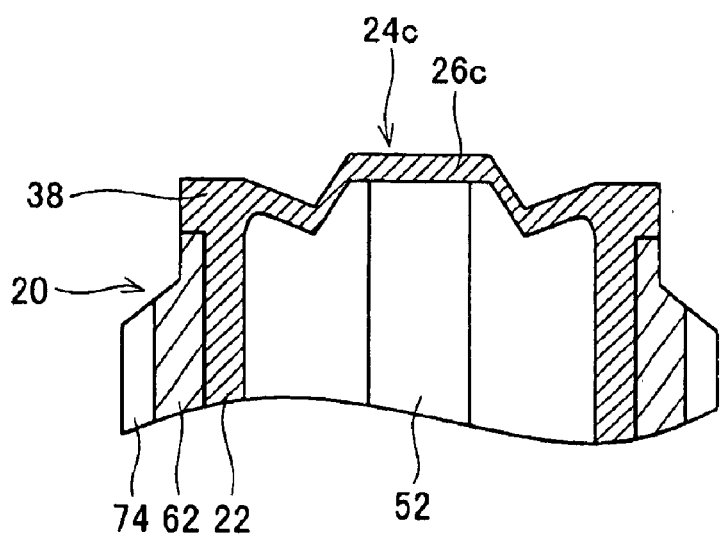
FIG. 7 shows a cross-sectional view showing a fourth embodiment of the invention.

(Fourth embodiment) A diaphragm 24c, shown in FIG. 7, is configured such that a central region 26c protrudes upwardly with respect to the diaphragm supporting portion (a housing anterior edge portion) 38.

Figure 8:
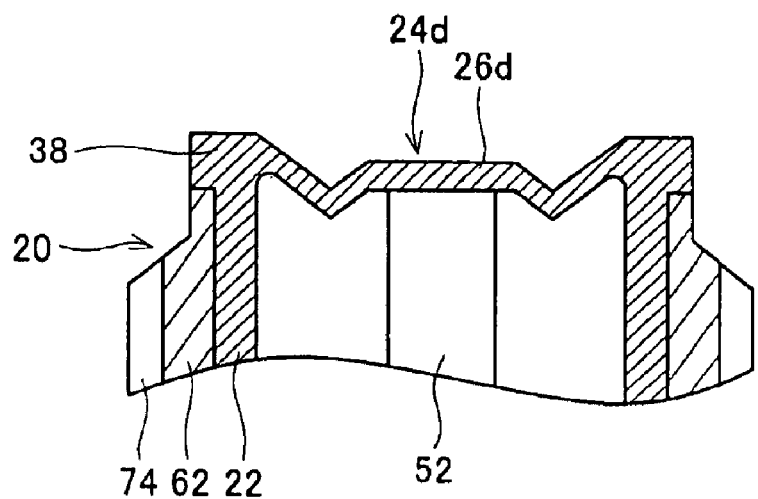
FIG. 8 shows a cross-sectional view showing a fifth embodiment of the invention.

(Fifth embodiment) A diaphragm 24d, shown in FIG. 8, is configured such that a central region 26d is retracted downwardly with respect to the diaphragm supporting portion (the housing anterior edge portion) 38.

Figure 9:
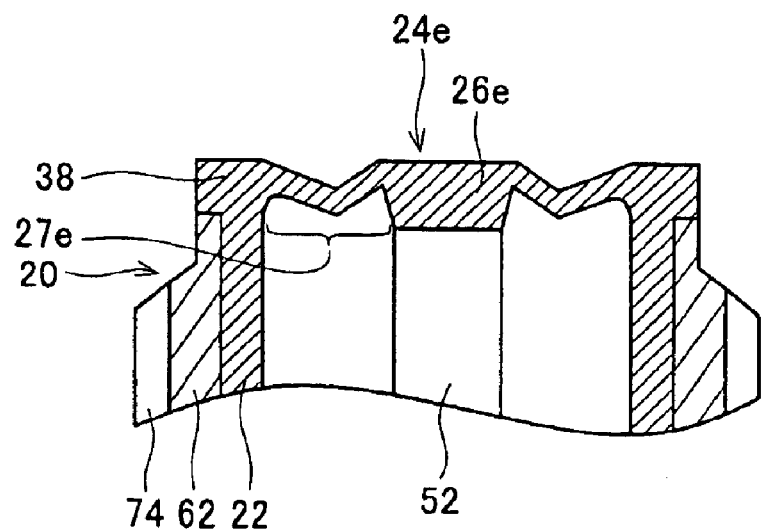
FIG. 9 shows a cross-sectional view showing a sixth embodiment of the invention.

(Sixth embodiment) In a diaphragm 24e, shown in FIG. 9, a central region 26e is thicker than in the first embodiment. Further, the central region 26e is thicker than a surrounding region 27e. This configuration renders it easy for the force transmitting rod 52 to be fixed more firmly to the diaphragm 24e. Further, a configuration is also possible wherein the central region 26e and the transmitting member 52 are unified, the thick central region 26e, rather than the force transmitting rod 52, directly pushing the sensor element (see component 54 in FIG. 1). In this case, the thick central region 26e functions as the force transmitting member.

Figure 10:
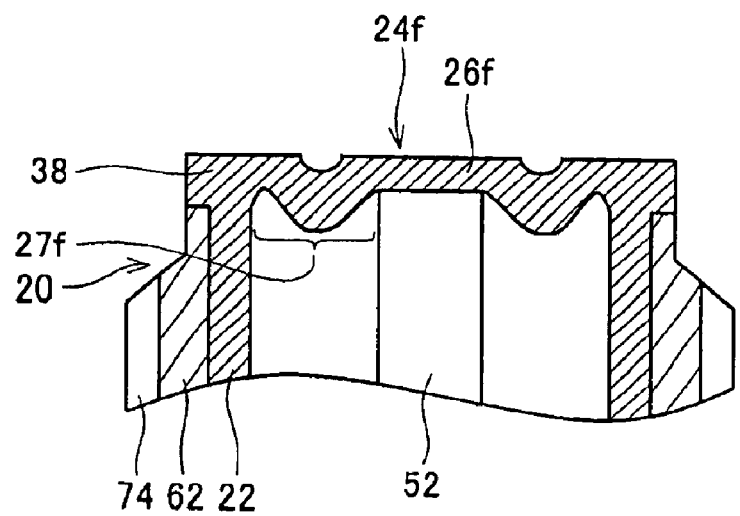
FIG. 10 shows a cross-sectional view showing a seventh embodiment of the invention.

(Seventh embodiment) In a diaphragm 24f, shown in FIG. 10, a central region 26f and a surrounding region 27f are thicker than in the first embodiment. Further, the thickness of the surrounding region 27f is not uniform.

Figure 11:
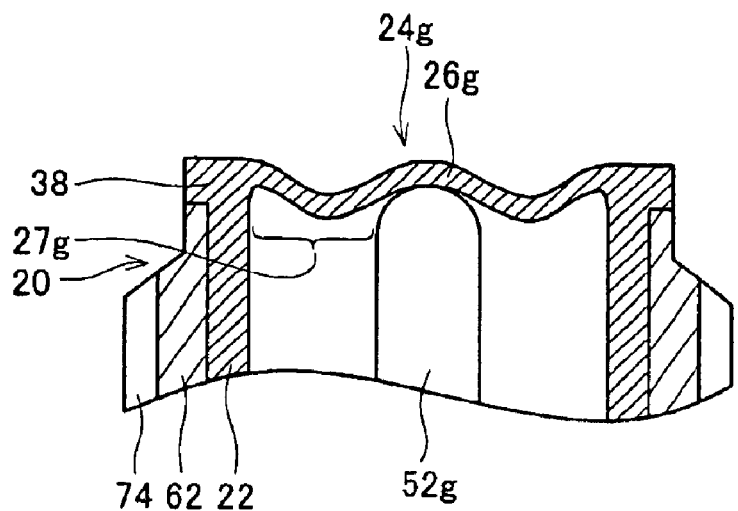
FIG. 11 shows a cross-sectional view showing an eighth embodiment of the invention.

(Eighth embodiment) In a diaphragm 24g, shown in FIG. 11, an anterior end (the end near the diaphragm 24g) of a force transmitting rod 52g has a hemispherical shape. A central region 26g of the diaphragm 24g has a curved shape that extends along the hemispherical anterior end of the force transmitting rod 52g. Further, a surrounding region 27g is U-shaped. In this configuration, it is easy to form the folded portions in the surrounding region 27g even when the diaphragm 24g is reduced in diameter.

Figure 12:
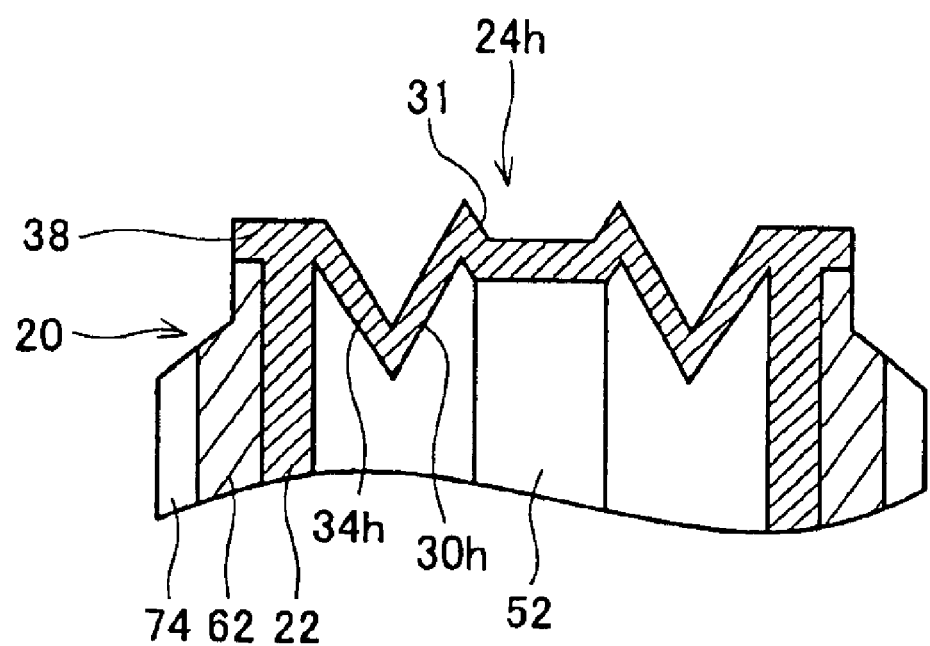
FIG. 12 shows a cross-sectional view showing a ninth embodiment of the invention.

(Ninth embodiment) In a diaphragm 24h, as shown in FIG. 12, folded portions 30h and 31 may be formed in addition to folded portions 30h and 34h. Further, folded portions may be formed in a shape that is, for example, W-shaped in cross-section.

Specific embodiments of the present invention are presented above, but these merely illustrate some possibilities of the invention and do not restrict the claims thereof. The art set forth in the claims includes various transformations and modifications to the specific examples set forth above.

For example, in FIG. 1, one folded portion is formed between the inner edge 28 and the outer edge 36 of the surrounding region 27. However, a plurality of folded portions may equally well be formed between the inner edge 28 and the outer edge 36 of the surrounding region 27. For example, as shown in the diaphragm 24h of FIG. 12, folded portions 30h and 31 may be formed in addition to folded portions 30h and 34h. Further, folded portions may be formed in a shape that is, for example, W-shaped in cross-section. Moreover, the thickness of the diaphragm 24 is not restricted to being approximately uniform. For example, there is no problem in the inclined portions 30 and 34 shown in FIG. 1 having different thicknesses.

Furthermore, the technical element disclosed in the present specification or figures may be utilized separately or in all types of conjunctions and are not limited to the conjunctions set forth in the claims at the filing of the application. Furthermore, the art disclosed in the present specification or figures may be utilized to simultaneously realize a plurality of aims or to realize one of these aims.

What is claimed is:

1. A pressure sensor, comprising;

a housing, a diaphragm partitioning an interior and an exterior of the housing, a sensor element provided within the housing, output values of the sensor element varying in accordance with a force exerted thereupon, a force transmitting member provided within the housing, the transmitting member moving in a direction in a case where a pressure is exerted upon the diaphragm, the force transmitting member thereby exerting a force upon the sensor element, wherein, the diaphragm has a first region contacting with the force transmitting member, and a second region connecting the first region with the housing, and wherein the second region of the diaphragm has folded portions comprising a first folded portion extending from the first region towards the housing and being inclined in a direction in which the force transmitting member moves when the pressure is exerted upon the diaphragm, a second folded portion extending from the first region towards the housing and being inclined in a direction opposite the moving direction of the force transmitting member, and connecting portion between the first folded portion and the second folded portion.

2. A pressure sensor as set forth in claim 1, wherein the diaphragm has an approximately round shape, the first region is located at a center of the round diaphragm, and the second region is located at a periphery of the first region.

3. A pressure sensor as set forth in claim 2, wherein the first region and the second region are provided concentrically.

4. A pressure sensor as set forth in claim 2, wherein the second region, viewed cross-sectionally along a radius of the diaphragm, is V-shaped or U-shaped.

5. A pressure sensor as set forth in claim 2, wherein an inner circumference portion of the second region is inclined in the moving direction of the force transmitting member in the case where pressure is exerted upon the diaphragm, and an outer circumference portion of the second region is inclined in a direction opposite said direction.

6. A pressure sensor as set forth in claim 2, wherein an outer circumference portion of the second region is inclined in the moving direction of the force transmitting member in the case where pressure is exerted upon the diaphragm, and an inner circumference portion of the second region is inclined in a direction opposite said direction.

7. A pressure sensor as set forth in claim 1, wherein the force transmitting member and a portion of the housing supporting the diaphragm are formed of material having a thermal expansion coefficient smaller than that of the diaphragm.

8. A pressure sensor as set forth in claim 1, wherein the force transmitting member and a portion of the housing supporting the diaphragm are formed of material having approximately identical thermal expansion coefficients.

9. A pressure sensor as set forth in claim 1, wherein the diaphragm and the force transmitting member are formed in a unified manner.

* * * * *